Patented July 27, 1937

2,088,438

UNITED STATES PATENT OFFICE 2,088,438

LIGHT-MODIFYING ARTICLE AND METHOD OF PRODUCING THE SAME

Nikolaus Riehl, Berlin-Lichtenberg, Germany, assignor to Degea Aktiengesellschaft (Auergesellschaft) Berlin, Germany, a corporation of Germany No Drawing. Application June 2, 1934, Serial No. 728,693. In Germany June 8, 1933

4 Claims. (Cl. 91—68)

For obtaining a better color contrast effect it is already known to employ glasses containing a certain quantity of neodymium oxide. Glasses of this type are used either by placing them in front of the source of light or by viewing objects through the glass. The visibility is increased by the application of glasses containing neodymium on account of the better color contrast effect. In addition, aesthetic advantages are also obtained in that the objects will appear in richer and purer colors. The employment of glass, however, for the purpose in view is also coupled with certain disadvantages. In using glass bulbs containing neodymium, for lamps there is naturally always the danger of breakage, and besides, the manufacture of such glasses is relatively expensive. It is also well known that in the manufacture of glass it is necessary to melt very large batches or quantities of glass at each operation. If a charge is spoiled, this will therefore entail a heavy loss. Furthermore, glass bodies containing neodymium cannot be employed in all cases for aesthetic reasons and for reasons of expediency or convenience.

It has been found that the action of the color contrast produced by neodymium in no way is restricted to its introduction into glass. According to the present invention it is possible to attain the same technical result, if neodymium-ammonia nitrate is introduced in the form of a solid or dissolved in substances other than glass or if it is applied on such other substances. These substances must be transparent or at least translucent. It has been found that in this manner the same effect may be obtained as with glasses containing neodymium. In view of the fact that I am no longer restricted to glass as a carrier for neodymium, the way is opened to utilizing the optical properties due to neodymium, in cases where the use of glass would not be possible or suitable. For instance, it is possible to produce screens or shades for lamps the external appearance of which cannot be distinguished from that of the customary lamp screens, which thus may be adapted to any taste and purpose of application, yielding at the same time the same color contrast as the formerly used neodymium-glasses. It is quite immaterial in this connection, whether such screen serves for the modifying light proceeding from a luminous source either directly or by reflection, or for viewing objects.

The invention comprises several modes of execution. Thus the desired effect may be obtained in a very simple manner by impregnating a translucent paper with a solution of neodymium-ammonium and nitrate. In order to prevent the neodymium solution from evaporating the said paper is provided on both sides with a coating of lacquer. Thus a flexible sheet is obtained which is well suited for the manufacture of screens or shades for lamps. Another method which has proved serviceable consists in evaporating the solvent of the solution introduced into the paper, so that the neodymium-salt will be deposited within the paper-mass in exceedingly fine distribution but in solid form. For the purpose of fixing the minutely distributed neodymium-salt within the paper it is preferable to soak the latter not only with a solution of the type mentioned, but with a binder such as for instance wheatstarch, Turkey gum and so on. This particular method also affords the possibility of subsequently producing patterns or ornaments on the paper by soaking it with oil, thereby obtaining ornamentation of a character which has acquired considerable vogue recently.

A further method for carrying out my invention consists in dusting a transparent layer, for instance of cellon, with a coating of a white or colored powder, as for instance barium sulphate or magnesia. This powder is mixed with a binder, for instance soluble glass, to which previously a certain quantity of neodymium-ammonia nitrate has been added. After the drying of the coating a stable layer is obtained, which on the one hand will spread light very efficiently, so that it will be well adapted for the manufacture of lamp-shades, and on the other hand will produce an effect increasing the contrast of colors. In this instance the neodymium may be introduced into the powdered material proper, for instance, by the formation of mixed crystals.

The introduction of the neodymium-salt into organic coatings of lacquer has proved of particular advantage. A suitable method in this connection consists in mixing the lacquer intimately with an aqueous solution of neodymium-ammonia nitrate, so that an emulsion of the neodymium solution is produced in the organic lacquer. This emulsion is poured over suitable surfaces or foundations and allowed to dry. After the drying of the organic lacquer a coating is obtained, which contains in most minute distribution an infinity of small drops of the neodymium-solution, each of which drops is surrounded by the organic lacquer which has set in the meantime.

In certain instances the neodymium-salt will crystallize out of the material, for example in such cases, where the water evaporates during the drying process or when the organic lacquer possesses a dehydrating effect, as is the case, for instance, with acetone lacquer. In both instances coatings are obtained which yield a very fine contrast of colors.

At rather simple, although not always available method for carrying out the invention consists in pouring an aqueous solution of neodymium ammonia nitrate, over a plane plate or sheet of clear or transparent material. Then the solution is allowed to evaporate slowly. The salt will then crystallize out, forming very flat crystals in the manner of ice-flowers, accommodating themselves to the surface treated. Especially thin and very neat patterns of ice-flower-like layers are obtained, if the viscosity of the aqueous solution is increased by adding some wheat-starch, Turkey gum, gelatin or the like. These binders in addition will also increase the stableness of the coating. It is advantageous to provide the layer obtained, subsequently with a coating of lacquer as a protection against atmospheric influences.

My present invention differs from the prior art materially as to the nature of the body or carrier within or upon which the light-modifying neodymium compound is applied. The body or carrier employed by me is indeed transparent or translucent, or in other words, pervious to light, but differs from glass by being practically unbreakable, and particularly highly resistant to the effects of heat; moreover, such body or carrier (as well as the resulting product) is preferably and generally flexible in the cold state, so that it can be readily bent to cylindrical or conical shape, as in making lamp shades, reflectors, and like articles.

I claim:

1. The method of producing a light-modifying article, which consists in applying neodymium-ammonia nitrate in a state of fine subdivision to a cellulosic material pervious to visible light rays and more resistant to fracture than glass.

2. A method according to claim 1, in which the cellulosic material is of flexible character.

3. A light-modifying article comprising a carrier of cellulosic material pervious to visible light rays and neodymium-ammonia nitrate associated with said carrier.

4. An article according to claim 3, in which the carrier consists of flexible material.

NIKOLAUS RIEHL.